(12) United States Patent
Botte et al.

(10) Patent No.: US 8,776,850 B2
(45) Date of Patent: Jul. 15, 2014

(54) TIRE VALVE FIXING ELEMENT

(75) Inventors: Patrick Botte, Cebazat (FR); Xavier Huchard, Pont-du-Chateau (FR); Julien Moynet, Clermont-Ferrand (FR); José-Philippe Valente, Orcet (FR)

(73) Assignees: Michelin Recherche et Technique S.A., Granges-Paccot (CH); TRW Automotive U.S., LLC, Livonia, MI (US)

( * ) Notice: Subject to any disclaimer, the term of this patent is extended or adjusted under 35 U.S.C. 154(b) by 1465 days.

(21) Appl. No.: 12/514,447

(22) PCT Filed: Nov. 8, 2007

(86) PCT No.: PCT/EP2007/062028
§ 371 (c)(1),
(2), (4) Date: Dec. 20, 2010

(87) PCT Pub. No.: WO2008/055944
PCT Pub. Date: May 15, 2008

(65) Prior Publication Data
US 2011/0079337 A1 Apr. 7, 2011

Related U.S. Application Data

(60) Provisional application No. 60/897,345, filed on Jan. 25, 2007.

(30) Foreign Application Priority Data

Nov. 9, 2006 (FR) ...................................... 06 09790

(51) Int. Cl.
*B60C 23/02* (2006.01)
*B60C 29/02* (2006.01)

(52) U.S. Cl.
USPC ......................................... 152/427; 152/152.1

(58) Field of Classification Search
USPC .............. 152/427, 428, 152.1; 73/146, 146.2, 73/146.8; 340/442
See application file for complete search history.

(56) References Cited

U.S. PATENT DOCUMENTS

| 6,055,855 | A  | * | 5/2000  | Straub  | 73/146.8 |
| 6,862,929 | B2 | * | 3/2005  | Luce    | 73/146.8 |
| 6,865,932 | B2 | * | 3/2005  | Luce    | 73/146.8 |
| 6,892,570 | B2 | * | 5/2005  | Cheng   | 73/146.8 |
| 7,145,443 | B2 | * | 12/2006 | Ito et al. | 340/442 |

(Continued)

FOREIGN PATENT DOCUMENTS

| EP | 0 816 136 | 1/1998 |
| EP | 1 449 683 | 8/2004 |

*Primary Examiner* — Glenn Dayoan
*Assistant Examiner* — Gregory Blankenship
(74) *Attorney, Agent, or Firm* — Cozen O'Connor (57) ABSTRACT

A fixing element (470) that enables an electronic unit (440) to be fixed on the inside of a tire-wheel assembly, on the tubular insert (433) of an inflation valve (430) of the tire-wheel assembly, the fixing element comprising: an interface piece (471) comprising means to establish a connection with the tubular insert of the valve and a housing (488) for a seal (460); at least one container (473) holding or designed to hold the electronic unit; and at least one attachment piece (472) that enables elastic coupling between the interface piece and the container. A method for mounting an electronic unit (440) on a tire-wheel assembly is also disclosed.

15 Claims, 8 Drawing Sheets

(56) References Cited

U.S. PATENT DOCUMENTS

| | | | |
|---|---|---|---|
| 7,281,421 B2 * | 10/2007 | Yin et al. | 73/146.8 |
| 7,562,566 B2 * | 7/2009 | Liao | 73/146 |
| 7,757,550 B2 * | 7/2010 | Chuang et al. | 73/146.8 |
| 7,870,866 B2 * | 1/2011 | Yu | 137/227 |
| 8,047,247 B2 * | 11/2011 | Palaoro | 152/427 |
| 8,245,747 B2 * | 8/2012 | Monjuvent et al. | 152/427 |
| 8,511,332 B2 * | 8/2013 | Robert | 137/227 |
| 2004/0103965 A1 * | 6/2004 | Luce | 152/152.1 |
| 2004/0163456 A1 * | 8/2004 | Saheki et al. | 73/146.8 |
| 2005/0087007 A1 * | 4/2005 | Uleski | 73/146 |
| 2007/0295076 A1 * | 12/2007 | Blossfeld et al. | 73/146.8 |
| 2008/0121032 A1 * | 5/2008 | Qiu et al. | 73/146.8 |
| 2010/0064791 A1 * | 3/2010 | Chuang et al. | 73/146.8 |
| 2010/0192682 A1 * | 8/2010 | Gory et al. | 73/146.8 |
| 2010/0319447 A1 * | 12/2010 | Uh et al. | 73/146.8 |
| 2012/0118057 A1 * | 5/2012 | Rigney et al. | 73/146.8 |

* cited by examiner

TIRE VALVE FIXING ELEMENT

RELATED APPLICATIONS

This is a U.S. National Phase Application under 35 USC 371 of International Application PCT/EP2007/062028, filed on Nov. 8, 2007.

This application claims the priority of French patent application no. 06/09790 filed Nov. 9, 2007 and U.S. provisional application Ser. No. 60/897,345, the subject matter of both of which is hereby incorporated by reference.

FIELD OF THE INVENTION

The present invention concerns tire inflation valves of the "clamp-in" type and more particularly "clamp-in" valves designed to be connected to electronic systems that enable certain tire parameters to be measured and/or transmitted. The invention also concerns a method for mounting assemblies formed of a "clamp-in" valve and an electronic system.

TECHNOLOGICAL BACKGROUND

In recent years there has been a rapid development of "smart" tires, i.e. tires fitted with electronic systems that enable certain parameters to be measured, such as the inflation pressure, the temperature of the tire or forces exerted on the tire when it is rolling Such tires are also provided with electronic systems that enable the measurements so obtained to be transmitted to the vehicle on which the said tires are fitted. (For the sake of brevity the measurement and/or transmission systems, whether or not they be integrated in a casing, will be indiscriminately called "electronic units" in what follows.)

Such electronic systems are very often located inside the tire. They can be fixed directly onto the tire itself, for example in a pocket formed on an inside wall of the tire. Another way to fix an electronic system inside a tire is to use a "patch" which is stuck onto an inside wall of the tire (see for example the U.S. Pat. No. 6,782,741). A third possible approach is to attach the electronic system integrally to the inflation valve of the tire. The U.S. Pat. No. 6,278,361 describes a design in which sensors are arranged in a container which is attached to the valve. The present invention relates to this third approach.

Nowadays several types of valves are available, designed for very different uses. One type of valve which is fixed by clipping into place is known as a "snap-in" valve. In such valves the metallic tubular insert that encloses the actual valve mechanism is anchored in a valve body, for example made of rubber. The valve body has a peripheral groove to receive the edge of the rim hole. An example of a "snap-in" valve comprising an electronic unit is described in the U.S. Pat. No. 6,005,480 and illustrated in FIG. 4. Such an assembly has the advantage of being very compact, but it also has disadvantages. The volume available for the electronic unit is very small; moreover, since the electronic unit is rigidly connected to the valve, it undergoes all the valve's movements which can subject it to considerable stress. There is also the risk of destroying the electronic unit during the mounting and removal of the tire.

"Snap-in" valves are limited to inflation pressures not exceeding a certain threshold (typically 4.5 bar when cold) and are only suitable for rims of certain thicknesses as mentioned in the manuals of standards (ETRTO, TRA, etc.). In the context of passenger cars capable of reaching high speeds (i.e. above 210 km/h) it is preferable to use valves fixed onto the wheel rim by screwing ("clamp-in" valves): the valve body is introduced into the rim hole from the side of the rim corresponding to the interior of the tire when the latter has been mounted on the rim; the valve body is locked by a nut screwed onto the body from the other side of the rim. The valve base has an annular recess to accommodate an annular seal (O-ring, grommet, etc.).

It has been proposed to fit an electronic unit on such a valve. For example the U.S. Pat. No. 6,805,001 discloses an assembly formed by a valve and a sensor, the sensor being fixed on the valve by a mechanical articulation of the ball-and-socket joint type which enables the sensor to be adapted to the various rim profiles (see also FIG. 5). Another assembly of the same type is described in the U.S. Pat. No. 6,055,855. The disadvantage of such assemblies is that fitting them entails an extra screwing operation: besides screwing the valve onto the rim, the electronic unit has to be fixed on the valve in an optimum position relative to the rim. This operation makes the mounting process more onerous and increases its cost.

An improved assembly is disclosed in the U.S. Pat. No. 6,862,929. According to that document the sensor is fixed on a support comprising a valve contact wall, said wall being articulated elastically on the rest of the support (see FIG. 6). In contrast to the assemblies described earlier, this articulation does not require a specially adapted valve and ensures that the sensor is positioned as close as possible to the rim, without any need to adjust the sensor's position manually. Its disadvantage is that mounting is still relatively complex: the support has to be fixed onto the valve, for example by a screw as in the embodiment illustrated in FIG. 6. The presence of such a small fixing piece entails disadvantages, such as more complex mounting (the piece might be lost) and greater cost. The same drawback is found in still another assembly disclosed in U.S. Pat. No. 6,895,810.

SUMMARY OF THE INVENTION

An objective of the present invention is to obtain an assembly consisting of a valve and an electronic unit, capable of adapting to various rim profiles and which can be mounted easily and inexpensively using a minimum of tools.

This objective is achieved with the help of a fixing element with which an electronic unit can be fitted on the inside of a tire-wheel assembly, onto the tubular insert of an inflation valve of the tire-wheel assembly, the fixing element comprising:
- an interface piece with means for establishing a connection with the tubular insert, and a housing for a seal;
- at least one container accommodating or designed to accommodate the electronic unit;
- at least one attachment piece that enables elastic coupling to be established between the interface piece and the container.

The fixing element can be fixed on the valve in several ways: the simplest solution is to screw it onto the tubular insert, provided that the interface piece has a suitable tapped thread, but it can also be fixed on by clipping. However, screwing has the advantage that removal is easier.

One aspect of the invention provides a clever way to simplify the assemblies proposed in the prior art. Compared with the assemblies described in U.S. Pat. No. 6,862,929 or U.S. Pat. No. 6,895,810, the part of the valve designed to make the tire-wheel assembly leakproof and the contact wall by which the valve is fixed to the sensor are merged in one, which reduces the operations needed for assembly. This simplification is obtained by breaking away from the teaching of U.S. Pat. No. 6,862,929 to avoid the use of a specially adapted valve. Quite on the contrary, the assembly formed by the valve and the electronic unit has been totally re-thought, the function of ensuring air-tightness being associated with the electronic unit fixing element rather than with the valve itself.

A fixing element according to an embodiment of the invention is designed to be fixed on an inflation valve comprising a tubular insert and a clamping nut, the clamping nut being located on a part of the tubular insert configured to be on the outside of the tire-wheel assembly when the valve is fitted on a tire-wheel assembly. The tire-wheel assembly is made airtight by adding a seal fitted into the housing provided on the interface piece of the fixing element. When the assembly consisting of the valve, the fixing element and the seal is fitted on a tire-wheel assembly and the clamping nut is tightened to the point when it comes in contact with the wheel rim, the effect of further tightening is to exert a tension force on the tubular insert. The latter transmits the force to the fixing element with the result that the seal is compressed against the wheel, thereby sealing the tire-wheel assembly. Thus, the same tightening operation enables not only the inflation valve but also the electronic unit to be fixed onto the wheel.

In a preferred embodiment the interface piece has a plurality of bearing parts each with at least one contact surface designed to come in contact with a wheel. One bearing part establishes a rigid contact between the fixing element and the wheel rim when the valve and its fixing element are mounted on the wheel, the effect of this being to limit the force supported by the seal and its compression. This embodiment concerns fixing elements configured for use with an grommet; it differs from traditional "clamp-in" valves, which are either provided with a single bearing part extending 360° all round a O-ring (which therefore has only a sealing function), or without a bearing part and designed for use with an grommet (which ensures at the same time the functions of sealing, centering and elastic screwing reserve). The fact of providing a plurality of bearing parts separated by gaps has the advantage of allowing the seal, which is most often made from an incompressible material, to deform more freely in the zones where it is not against a bearing part, which improves the sealing action.

Preferably, the interface piece has three bearing parts. This gives a mechanical assembly which respects the principles of tightening, with effective force absorption that ensures proper sealing with little space requirements. Compared with a design having two bearing parts, this solution improves the force absorption in every direction whereas an interface piece with only two bearing parts offers only moderate resistance in a tilting direction perpendicular to the axis joining the two bearing parts. It is of course possible to multiply the number of bearing parts beyond three, keeping in mind that the bearing parts should be well distributed around the housing provided for the seal.

Figure 12:
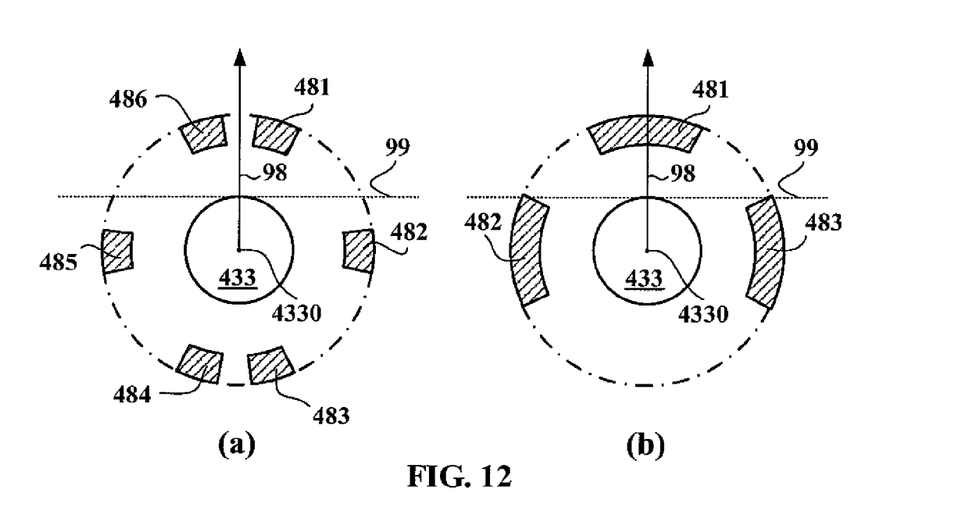
FIG. 12 is a schematic illustration of the configuration of the contact surfaces of the bearing parts of a fixing element according to an embodiment of the invention.

Preferably, at least one bearing part is positioned so that when the fixing element is fitted on a valve of a tire-wheel assembly, the said bearing part is radially outside the tubular insert in the plane which is perpendicular to the axis of the tubular insert and which comprises the contact surfaces of the bearing parts configured to be in contact with the wheel of the tire-wheel assembly (see also FIG. 12).

Note that in the context of the present document "radial" means any direction perpendicular to the rotation axis of a tire-wheel assembly and intersecting that axis. When a radial direction is mentioned in the context of an isolated element of a tire-wheel assembly, this means a direction corresponding to a radial direction when that element is appropriately mounted on a tire-wheel assembly. The same applies, mutatis mutandis, to the "axial" direction.

The particular configuration in which at least one of the bearing parts is radially outside the tubular insert enables better control of the stresses exerted on the fixing element and on the seal when they are fitted on a tire-wheel assembly and this assembly is set in rotation. The centrifugal force, which becomes considerable when the rotation frequency is high, tends to cause the electronic unit to move radially outwards. Consequently, the fixing element is tilted about its point of attachment to the valve. If one of the bearing parts is radially outside the tubular insert in the plane defined above it opposes this tilt, and that has the effect of reducing the stresses supported by the seal.

This mechanical role of the bearing part is optimized when the contact surface of one of the said first bearing parts, in the plane perpendicular to the axis of the tubular insert and containing the surfaces of the contact areas configured to come in contact with the wheel of the tire-wheel assembly, is centered around the radial direction passing through the point of intersection between the axis of the tubular insert and the said plane. An example is illustrated in FIG. 12 (b).

Figure 13:
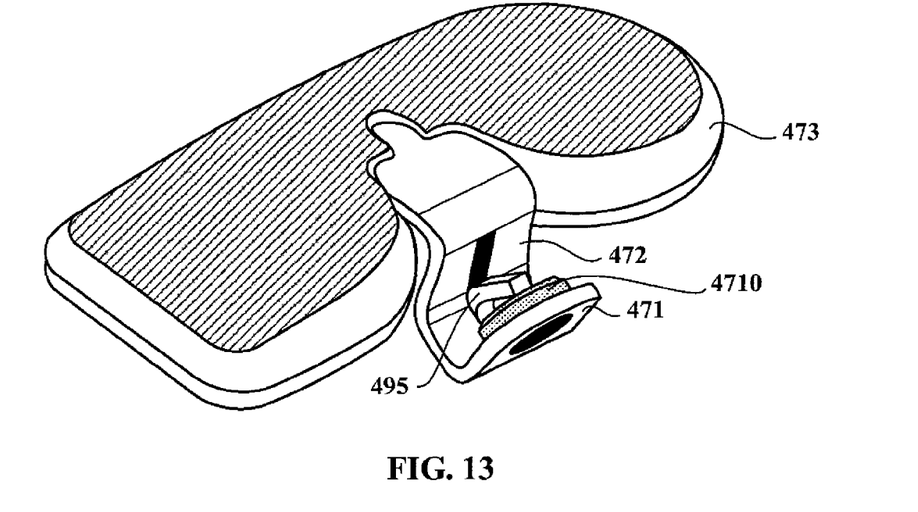
FIG. 13 shows a schematic perspective view of a fixing element according to an embodiment of the invention.
Figure 14:
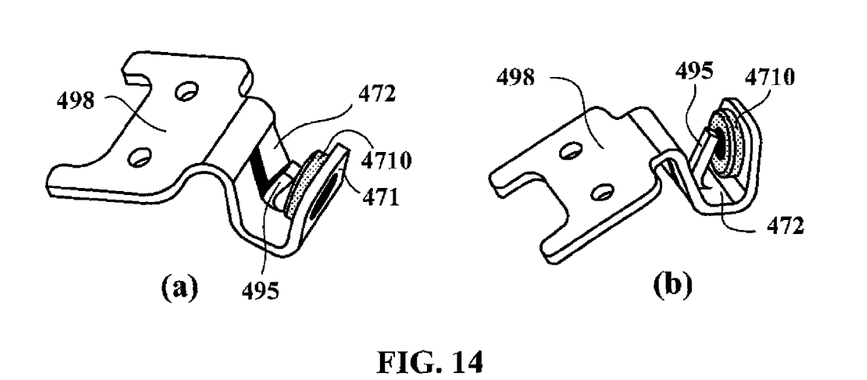
FIG. 14 shows two schematic perspective views of a fixing element according to an embodiment of the invention.

In a second preferred embodiment the attachment piece of the fixing element comprises a stiffening rod designed to be in contact with the tubular insert of the valve when the fixing element is fixed onto the tubular insert. Such a rod acts as a force strut and stiffens the bending zone of the attachment piece. This gives a better distribution of the stress field. Examples are shown in FIGS. 13 and 14.

In a third preferred embodiment the fixing element also comprises a rigid stop which restricts the elastic deformation of the attachment piece. In particular, the stop can consist of a protrusion on the container designed to come in contact with the interface piece or the tubular insert when the elastic deformation of the attachment piece exceeds a predetermined value.

In a fourth preferred embodiment the attachment piece can undergo plastic deformation in a manner that allows the geometry of the fixing element to be adapted to the geometry of the wheel during the mounting of the element on a tire-wheel assembly. The plastic deformation of the attachment piece then allows it to adapt to the particular geometry of the rim, while its elasticity allows it to react to the forces exerted on it during rolling.

Figure 8:
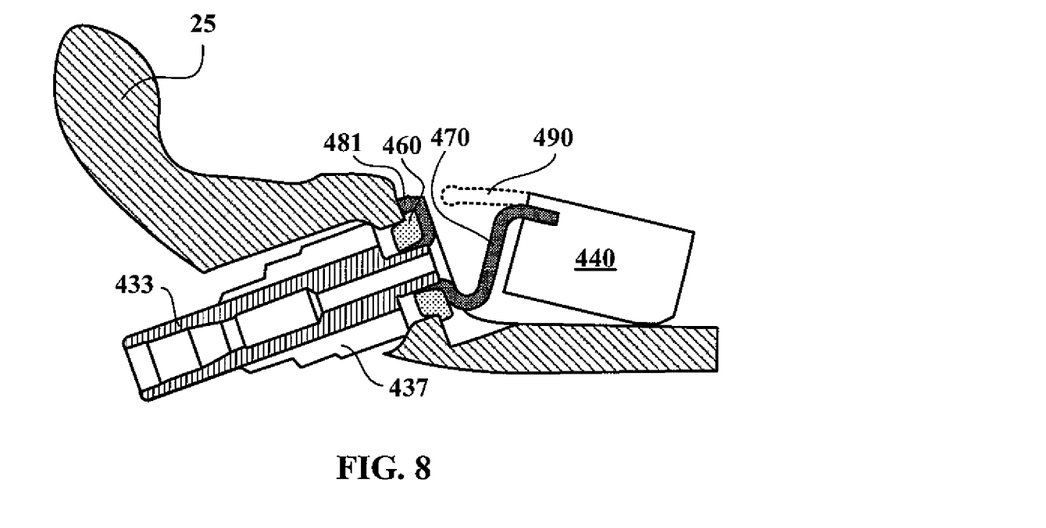

In a fifth preferred embodiment, the attachment piece is V-shaped or U-shaped in an axial section plane, the V or U being open on the radially outer side. FIG. 8 shows an example of a V-shaped attachment piece, the apex of the V being rounded. The effect of this geometry is that the tilting of the fixing element induced by centrifugal force tends to bend the attachment piece in a closing direction, which is a direction in which, by virtue of its structure, the attachment piece offers a higher resistance.

It is clearly possible to combine several, and even all the embodiments described above. Thus, a fixing element according to the invention can have a plurality of bearing parts, a stiffening rod, a rigid stop and a V-shaped attachment piece capable of undergoing plastic deformation.

As suggested earlier, another aspect of the invention concerns an assembly comprising:

an inflation valve comprising a tubular insert and a clamping nut, the clamping nut being on a part of the tubular insert configured to be on the outside of the tire-wheel assembly when the valve is fitted on a tire-wheel assembly;

a fixing element according to any of the above-mentioned embodiments fixed on the valve; and a seal accommodated in a housing in the interface piece of the fixing element;

the assembly being designed such that when the assembly is mounted on a tire-wheel assembly and the clamping nut is tightened, the tubular insert exerts a tension force on the fixing element whose result is to compress the seal against the wheel, so ensuring that the tire-wheel assembly is leakproof. Another aspect of the invention concerns a tire-wheel assembly comprising such an assembly.

Another aspect of the invention concerns a method for fitting an electronic unit onto a tire-wheel assembly. In a first embodiment the method comprises the following steps:

A) a fixing element as mentioned above, containing the electronic unit, is fixed onto a tubular insert of a valve and a suitable seal is positioned in the housing provided in the interface piece of the fixing element (the relative sequence of the two operations of fixing the fixing element and positioning the seal is unimportant);

B) the tubular insert is introduced into a rim hole of the tire-wheel assembly, so that when the tire is mounted on the wheel, the fixing element is inside the volume delimited by the tire and the wheel, and one end of the tubular insert is outside this volume;

C) a clamping nut is screwed onto that end of the tubular insert so that the clamping nut is in contact with the wheel and exerts a tension force on the tubular insert, and consequently on the fixing element, the result of this force being to compress the seal against the wheel, so ensuring that the tire-wheel assembly is leakproof; and D) the tire is mounted on the wheel.

The fixing element can also be fitted "empty" (i.e. without the electronic unit) and an intermediate step can be added, which consists in inserting the electronic unit into the container of the fixing element, e.g. between steps C) and D) of the above method.

An embodiment of the method comprises the following steps:

A) a seal is positioned in the housing of a fixing element that includes an interface piece that has a tapped thread to enable the piece to be screwed onto the tubular insert of the valve, the fixing element containing the electronic unit;

B) the fixing element and the seal are positioned on the wheel rim of the tire-wheel assembly in such manner that the seal surrounds a rim hole of the rim;

C) a tubular insert with a clamping nut is introduced into a rim hole of the wheel of the tire-wheel assembly, in such manner that when the tire is mounted on the wheel, the nut is outside the volume delimited by the tire and the wheel and one end of the tubular insert is inside that volume;

D) the tubular insert provided with the clamping nut is screwed into the tapped thread of the interface piece of the fixing element, so that the clamping nut comes in contact with the wheel and exerts a tension force on the tubular insert and consequently on the fixing element, the result of that force being to compress the seal against the wheel, so ensuring that the tire-wheel assembly is leakproof; and E) the tire is mounted on the wheel.

Here again, the fixing element can be fitted "empty" (i.e. without the electronic unit) and an intermediate step, consisting in the insertion of the electronic unit into the container of the fixing element, can be added, e.g. between steps D) and E) of the second embodiment of the method.

DETAILED DESCRIPTION OF THE DRAWINGS

Figure 1:
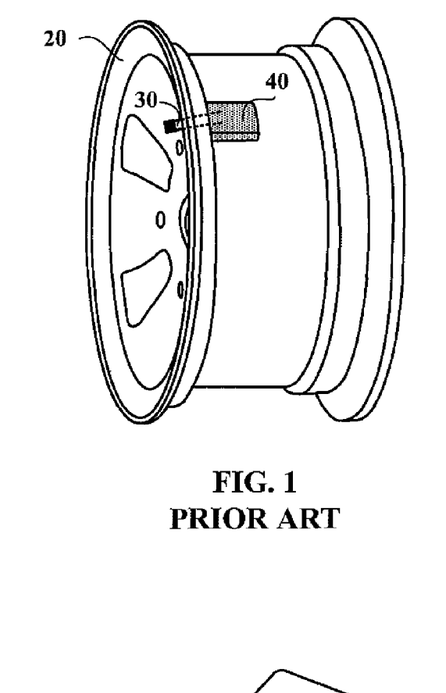
FIG. 1 shows a schematic perspective view of a wheel of the prior art, fitted with a unit configured to be mounted inside the tire attached to the inflation valve.

FIG. 1 shows a perspective view of a wheel 20 of the prior art, fitted with an inflation valve 30 and a container 40 designed to accommodate sensors. For the sake of clarity, the tire 10 is not shown.

Figure 2:
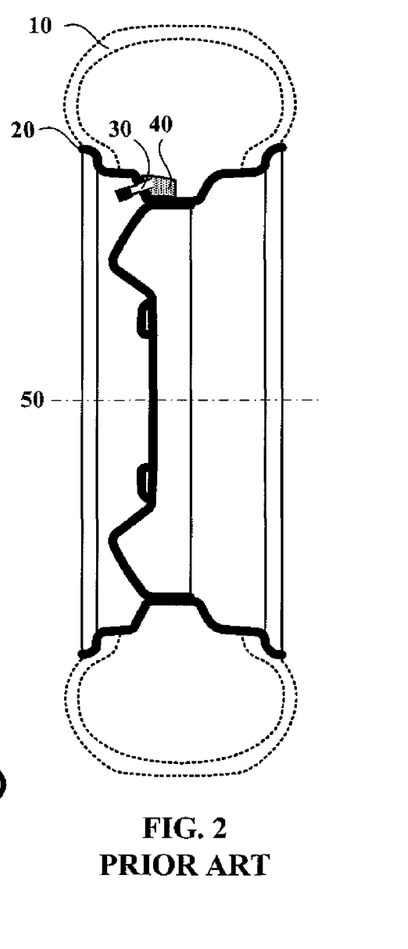
FIG. 2 shows a schematic section through a tire-wheel assembly of the prior art, fitted with a unit configured to be mounted inside the tire and attached to the inflation valve.

FIG. 2 shows a section through another tire-wheel assembly of the prior art, consisting of a tire 10 and a wheel 20 and fitted with an inflation valve 30 and a container 40 designed to accommodate sensors. The rotation axis 50 of the tire-wheel assembly is also shown.

Figure 3:
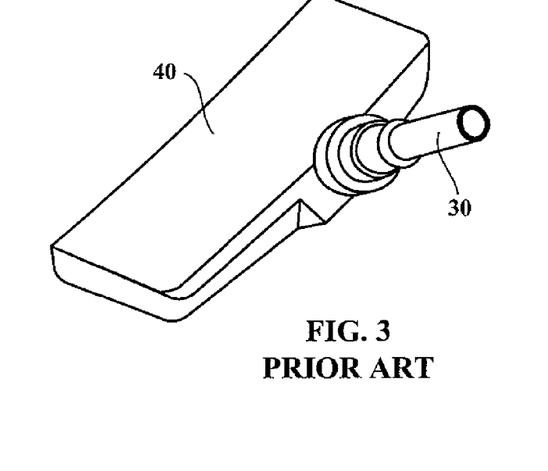
FIG. 3 shows a schematic perspective view of an inflation valve and a container attached thereto, designed to accommodate sensors.

FIG. 3 shows a schematic perspective view of an inflation valve 30 and a container 40 attached to the valve and designed to accommodate sensors; such a container is known, for example, from U.S. Pat. No. 6,278,361.

Figure 4:
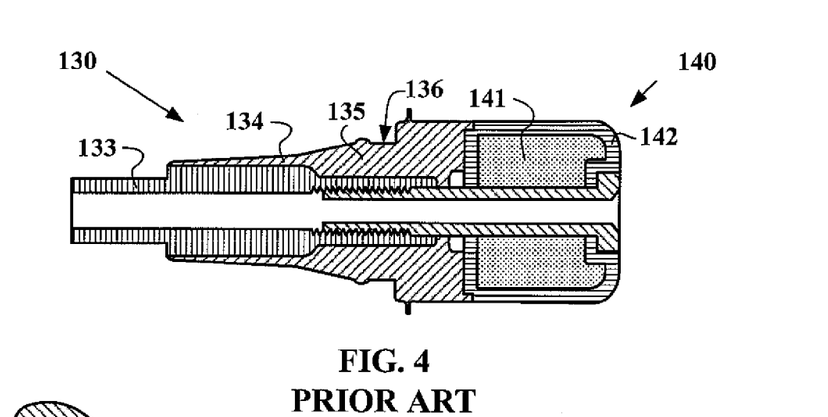
FIGS. 4 to 6 show schematic sections through an inflation valve and a fixing element of an electronic unit according to the prior art.

FIG. 4 shows a section through a valve 130 of the "snap-in" type comprising an electronic unit 140, the assembly formed by the valve 130 and the electronic unit 140 being similar to those known from U.S. Pat. No. 6,005,480. One can see the tubular insert 133 comprising a conventional valve mechanism (not shown), the covering 134 designed to protect the tubular insert, and the valve base 135 with a peripheral groove 136 provided in order to receive the edge of the rim hole. The electronic unit comprises a sensor 141 protected by a capsule 142.

Besides the disadvantages stemming from the fact that the valve is of the "snap-in" type (limitation of the pressure and the speed at which it can be used, etc.), a rigid mounting of this type has other drawbacks. As already mentioned, the volume available for the electronic unit is relatively small; besides, the full weight of the electronic unit is supported on the valve and tends to amplify its movements, which can reduce its sealing efficacy. Finally, the electronic unit is exposed to shocks during the operations of mounting the tire on the wheel or removing it therefrom.

Figure 5:
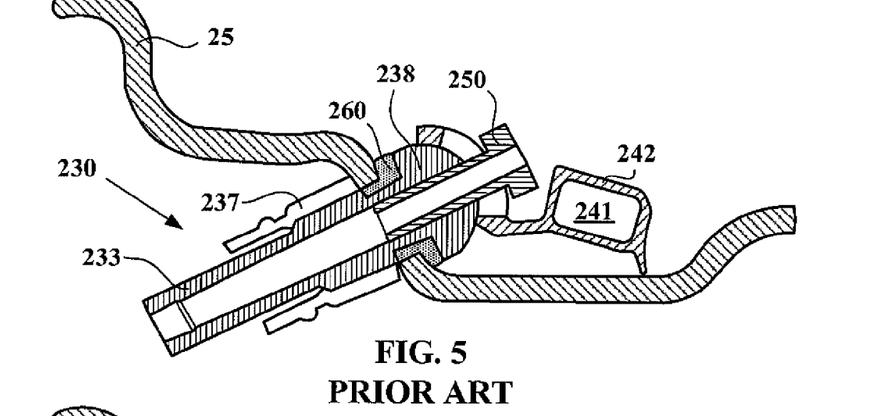

Other valves of the prior art avoid those disadvantages by taking advantage of the available area of the rim of the tire-wheel assembly. FIG. 5 shows a section through a valve 230 of the "clamp-in" type fitted on a rim 25 of a tire-wheel assembly. One can see the tubular insert 233 opening into a metallic valve base 238 and the clamping nut 237 screwed onto the tire on the outside of the tire-wheel assembly. The electronic unit 241 is encapsulated in a container 242. The support of the container 242 is fixed on the valve 230 by a screw 250 provided with a hole that extends the tubular insert 233. During the screwing of the screw 250 the support of the container 242 can tilt; this ball-and-socket-type articulation enables its positioning to be optimized. On completion of the screwing, the screw 250 is tightened and ensures that the support is held firmly at the bottom of the rim's profile. The tire-wheel assembly is made leakproof in a known way: during the tightening of the clamping nut 237, the latter exerts a tension force on the tubular insert 233 and consequently on the valve base 238, the result of this force being to compress the seal 260 against the rim 25.

Figure 6:
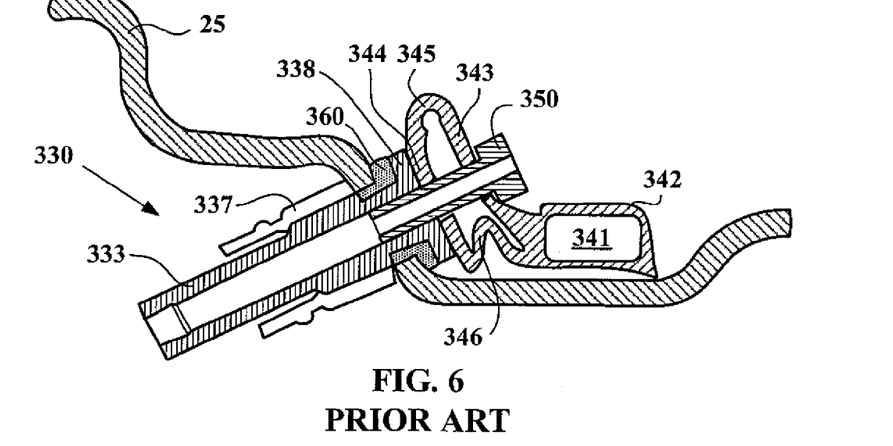

Nevertheless, such a configuration has the disadvantage that it is complicated to fit (and remove), in particular because screwing must be carried out while the support of the electronic unit is mounted on the valve. FIG. 6 shows another assembly of the prior art which slightly alleviates that difficulty. Again, one can see a tubular insert 333 opening into a metallic valve base 338 and a clamping nut 337 screwed onto the tubular insert on the outside of the tire-wheel assembly. The electronic unit 341 is encapsulated in a container 342. The support of the container 342 is fixed on the valve 330 by a screw 350 provided with a hole that extends the tubular insert 333. The originality of this assembly consists in the geometry of the support of the container 342. This has a first wall 343 which is rigid and integral with the part of the support of the container 342 which accommodates the electronic unit 341; this first wall 343 acts as a contact surface for the head of the screw 350. The support of the container 342 also has a second rigid wall 344 designed to come in contact with the valve. The two walls 343 and 344 are connected by an elastic elbow 345 and by a bellows 346. The elasticity of the elbow 345 and the bellows 346 ensures that the sensor is positioned as near as possible to the rim 25. The tire-wheel assembly is made leakproof in a manner analogous to the example in FIG. 5, by compression of the seal 360 by the valve base 338 during the tightening of the clamping nut 337.

One of the disadvantages of this prior-art assembly is the complexity entailed when mounting it. In particular, two screwing operations have to be carried out when fitting it onto the tire-wheel assembly: the clamping nut must be tightened so as to fix the valve 337 to the rim 25, and then the screw 350 must be tightened so as to fix the support of the container 342 of the electronic unit 341 onto the valve 330.

Figure 7:
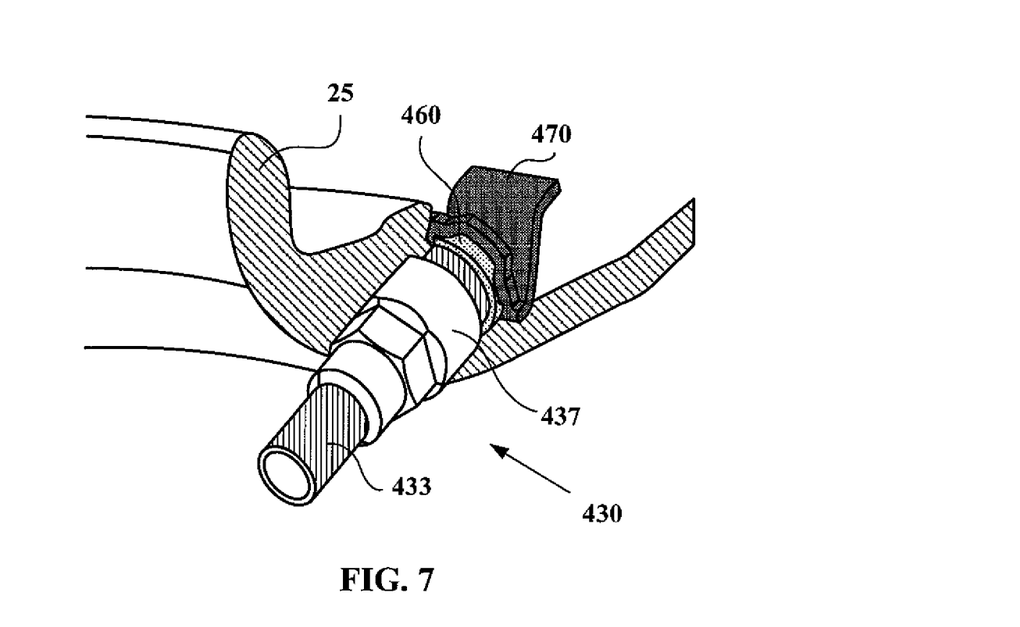
FIGS. 7 to 10 show schematic views of an inflation valve and an electronic unit fixing element according to an embodiment of the invention.

This difficulty is overcome in an assembly formed by a valve and fixing element according to the invention. FIG. 7 shows a perspective view of such an assembly mounted on a rim 25 of a tire-wheel assembly (the container holding the electronic unit is not shown). FIG. 8 shows the same assembly sectioned along an axial plane. One can see the valve 430 comprising a tubular insert 433 and a clamping nut 437. The valve is screwed into the tapped thread of the interface piece of a fixing element 470 made in the shape of a "V", which opens onto a container designed to hold an electronic unit 440. The sealing of the tire-wheel assembly is ensured by an grommet 460 located between a housing provided in the interface piece of the fixing element 470 and the rim 25. This grommet 460 is compressed by tightening the clamping nut 437 against the rim 25.

When mounting the assembly formed by the valve 430 and the fixing element 470 on the rim, it is desired to keep the container holding the electronic unit 440 in contact with the bottom of the rim. As a matter of fact, the angle between the axis of the tubular insert and the rim wall varies from one rim type to another. If the attachment piece can undergo plastic deformation, it can adapt to the geometry of the rim. In other words, its plastic accommodation enables the fixing element 470 to conform to the geometry of the rim. Plastic accommodation can also take place during the first centrifuging cycle.

Thereafter, the attachment piece of the fixing element 470 retains a certain elasticity, which allows a reversible deformation of the assembly when subjected to large stresses (for example, stresses due to the centrifugal force when rolling at high speed). Several means can be envisaged for restricting this elastic deformation; for example, the fixing element 470 can be provided with a rigid stop, in this case in the form of a protuberance 490 on the container holding the electronic unit 440 which extends towards the interface piece and comes in contact with it when the deformation of the attachment piece exceeds a certain predetermined limit.

Figure 9:
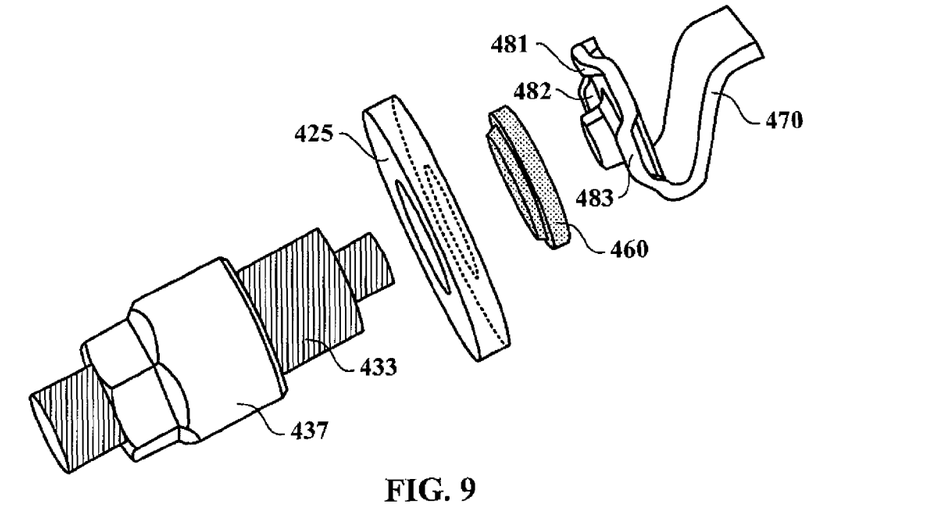
Figure 10:
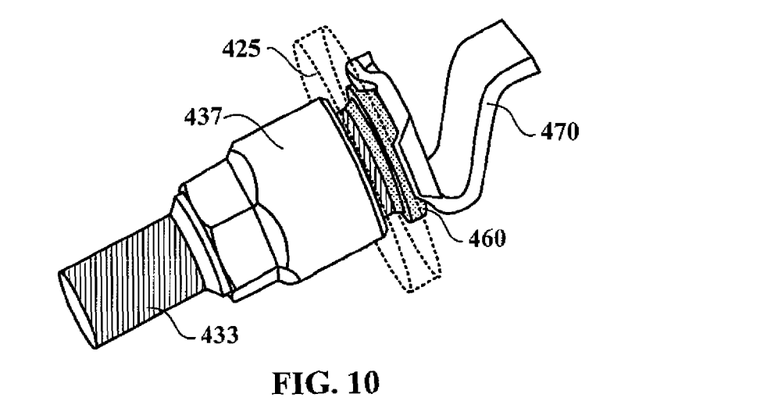

FIGS. 9 and 10 show the same assembly formed by the valve 430 and a fixing element (without the container holding the electronic unit), in an exploded view and after assembly. In this case the tubular insert 433 and its clamping nut 437 are introduced into the rim hole (the portion 425 of the rim that surrounds the hole is shown). On the other side of the rim are the grommet 460 and the fixing element 470 into which the tubular insert is screwed (again, the container holding the electronic unit is not shown). Once assembled, the grommet 460 is held in the interface piece of the fixing element; the latter is in contact with the rim 25 via the contact surfaces of the three bearing parts 481, 482 and 483.

Figure 11:
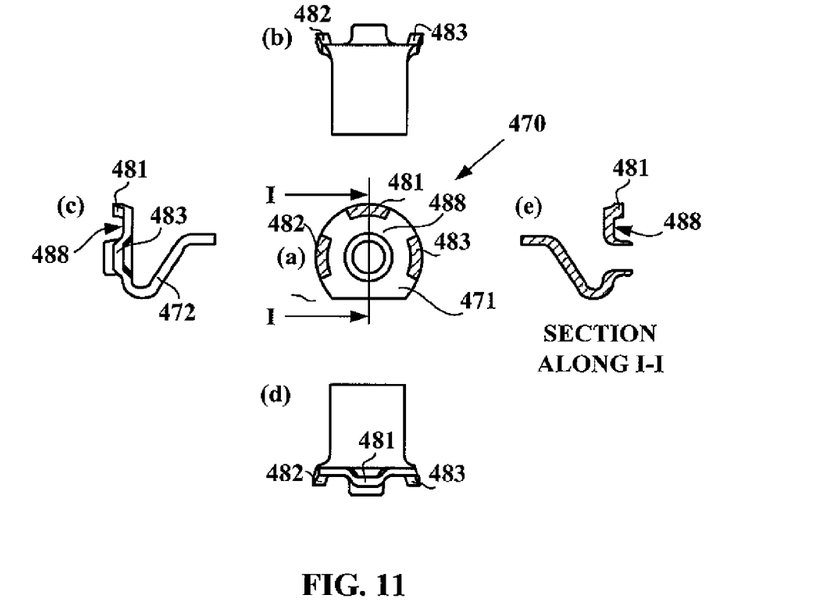
FIG. 11 shows various views of a fixing element according to an embodiment of the invention.

FIG. 11 shows a fixing element according to the invention in more detail (the container holding the electronic unit is not shown). Various views are presented: FIG. 11(a) shows a front view of the fixing element 470, as offered to the valve. Only the interface piece with the contact surfaces of the three bearing parts 481, 482 and 483, and the housing 488 for the seal (not shown) can then be seen. FIGS. 11(b), (c) and (d) correspond to views of the same element 470 seen from below, from the side and from above, respectively. The V-shaped attachment piece 472 can be seen. Finally, FIG. 11(e) shows the element 470 sectioned along I-I (see FIG. 11(a)).

FIG. 12 illustrates schematically the configuration of the contact surfaces of the bearing parts of two fixing elements according to the invention, in the plane perpendicular to the axis 4330 of the tubular insert 433 of the valve 430. The radial direction is indicated by the arrow 98. The fixing element shown in FIG. 12 (a) has six bearing parts 481-486. Two of them, namely the areas 481 and 486, are radially outside the tubular insert 433, the radial limit of the tubular insert being indicated by the dotted line 99. For the fixing element shown in FIG. 12 (b) the number of bearing parts is reduced to three, 481-483. The variant in FIG. 12 (b) has the preferred characteristic that the bearing part 481 radially outside the tubular insert 433 is centered around the radial direction 98 passing through the point of intersection between the axis 4330 of the tubular insert and the plane perpendicular to the axis 4330 of the tubular insert 433 of the valve 430.

FIG. 13 shows a schematic perspective view of a fixing element according to the invention. The bearing parts are not shown. This fixing element has an interface piece 471 provided with a threaded insert 4710 which enables a tubular insert of a valve to be fixed thereto, an attachment piece 472 and a container designed to hold an electronic unit. This fixing element has the special feature that the attachment piece comprises a stiffening rod 495 designed to come in contact with the tubular insert of the inflation valve when the fixing element is fixed onto the tubular insert. The stiffening rod 495 acts as a force strut and stiffens the bending zone under the fixing insert 4710. Finite-element calculations have shown that such a rod enables better control of the stress concentrations.

FIG. 14 shows two schematic perspective views of the same fixing element 470 according to the invention before the container 473 has been molded on in the area 498. Again, the bearing parts are not shown.

Figure 15:
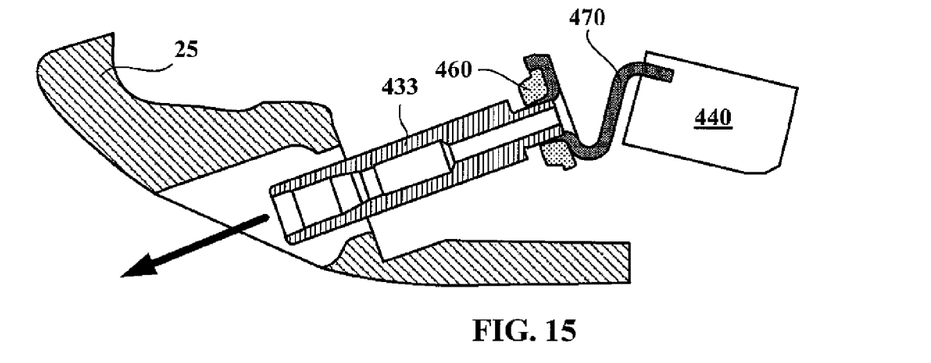
FIGS. 15 to 17 show schematic sections illustrating steps of the method for mounting an electronic unit on a tire-wheel assembly according to an embodiment of the invention.
Figure 16:
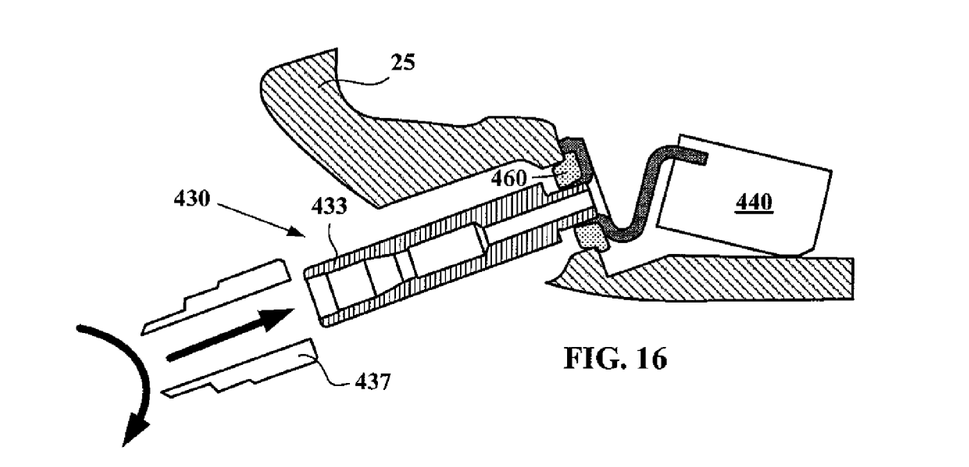
Figure 17:
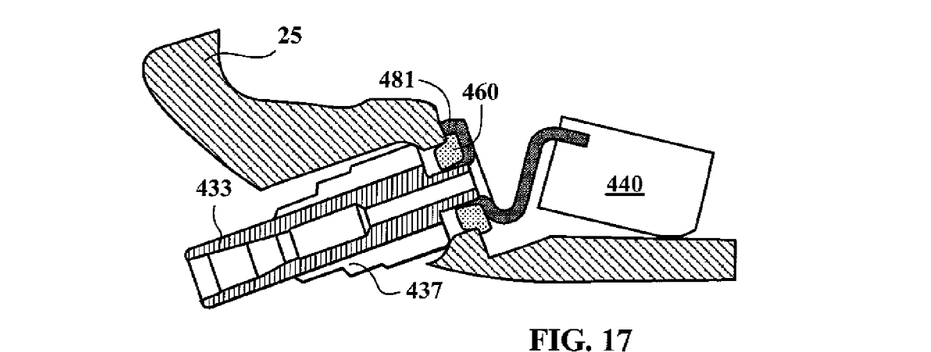

FIGS. 15 to 17 illustrate schematically three steps of the first embodiment of the method according to the invention for mounting an electronic unit 440 on a tire-wheel assembly. First, the fixing element 470 is screwed onto the tubular insert 433 of an inflation valve 430. After positioning a suitable grommet 460 in the housing provided on the interface piece of the fixing element 470, the tubular insert 433 is introduced into a rim hole of the rim 25. That step is shown in FIG. 15. At the end of that step, the fixing element 470 is inside the internal volume of the tire after the tire has been mounted; one end of the tubular insert is outside that volume.

Then, a suitable clamping nut 437 is screwed onto the end of the tubular insert 433 that is "outside" the tire-wheel-assembly (i.e. freely accessible even when the tire is mounted on the wheel). This step is shown in FIG. 16. On completion of that step the clamping nut 437 is in contact with the wheel and exerts a tension force on the tubular insert 433 and consequently on the fixing element 470, the result of that force being to compress the grommet 460 against the rim 25, so ensuring that the tire-wheel assembly is leakproof. This final configuration is shown in FIG. 17. The tire can then be mounted on the wheel.

Figure 18:
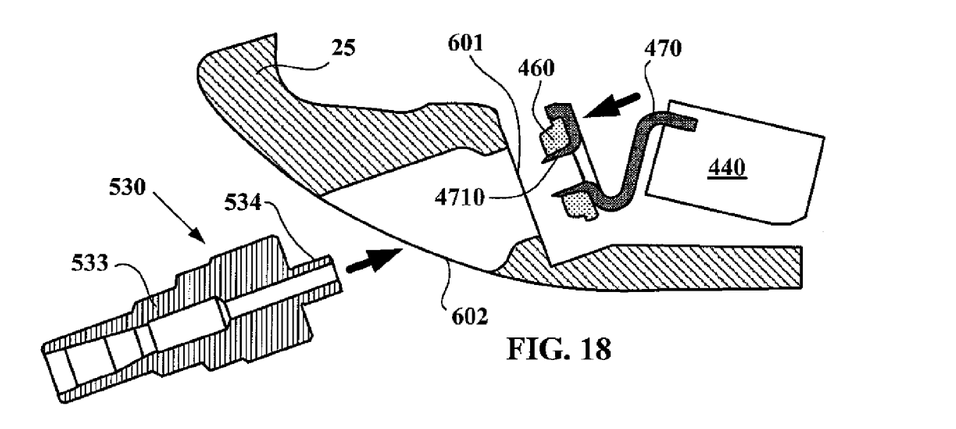
FIGS. 18 to 20 show schematic sections illustrating steps of the method for mounting an electronic unit on a tire-wheel assembly according to an embodiment of the invention.
Figure 19:
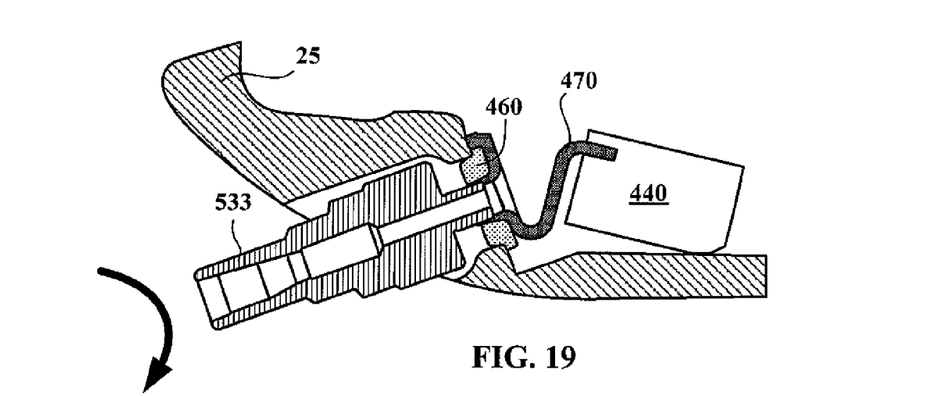
Figure 20:
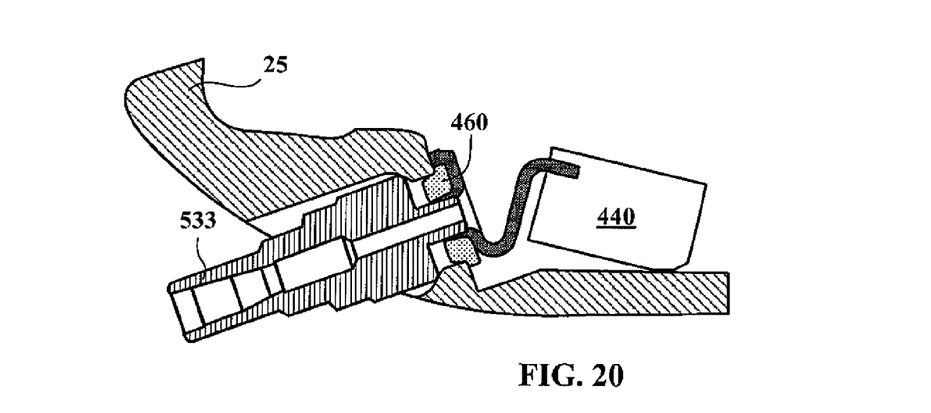

FIGS. 18 to 20 illustrate schematically three steps of the second embodiment of the method according to the invention for mounting an electronic unit 440 on a tire-wheel assembly.

First, the grommet 460 is placed in the housing of the fixing element 470 whose interface piece has a tapped thread 4710 that enables the piece to be screwed onto the tubular insert 533 of the valve 530. In this case the fixing element 470 already contains the electronic unit 440. The fixing element 470 and the grommet 460 are then positioned on the rim 25 so that the grommet 460 comes in contact with the rim 25 in the area surrounding the internal orifice 601 of the rim hole. FIG. 18 shows the fixing element before that contact has been established.

The tubular insert 533 of the valve 530 is then introduced into the rim hole, proceeding from "outside" the tire-wheel assembly, i.e. through the external orifice 602 of the rim hole which, in contrast to the orifice 601, does not open into the volume that will form the inside of the tire once the tire has been mounted. The direction of introduction is suggested by an arrow in FIG. 18. Note that the tubular insert 533 is provided with a clamping nut integral with the tubular insert.

FIG. 19 shows the situation after the tubular insert 533 has been introduced into the rim hole. The tubular insert has a male thread 534 (see FIG. 18) that matches the female, tapped thread 4710 of the interface piece of the fixing element 470 so that the tubular insert 533 can be screwed onto the fixing element 470. Those skilled in the art will see that it would also be possible to provide the tubular insert 533 with a female, tapped thread and the fixing element 470 with a corresponding male thread: what is important is that a firm connection is made between the tubular insert 533 and the fixing element 470, in this case by screwing. So the tubular insert 533 is screwed onto the fixing element 470 until the clamping nut comes in contact with the rim 25 and the tubular insert 533 therefore exerts a tension force on the fixing element 470, the result of that force being to compress the seal 460 against the rim 25, thereby ensuring that the tire-wheel assembly is leakproof. The final configuration is shown in FIG. 20. The tire can then be mounted on the wheel.

The invention claimed is:

1. A fixing element that enables an electronic unit to be fixed on the inside of a tire-wheel assembly, on a tubular insert of an inflation valve of the tire-wheel assembly, the fixing element comprising:
   an interface piece comprising means to establish a connection with the tubular insert, and a housing for a seal;
   at least one container holding or designed to hold the electronic unit; and
   at least one attachment piece that enables elastic coupling between the interface piece and the container,
   wherein the interface piece has a plurality of bearing parts, each having at least one contact surface configured to come in contact with the wheel of the tire-wheel assembly.

2. The fixing element according to claim 1, wherein at least one first bearing part is located so that when the fixing element is mounted on the valve of a tire-wheel assembly, the first bearing part is radially outside the tubular insert in the plane perpendicular to the axis of the tubular insert of the valve and containing the contact surfaces of the bearing parts designed to come in contact with the wheel of the tire-wheel assembly.

3. The fixing element according to claim 1, wherein the contact surface of one of the at least one first bearing parts is centered around the radial direction passing through the point of intersection between the tubular insert's axis and the plane perpendicular to the tubular insert's axis and containing the contact surfaces of the bearing parts designed to come in contact with the wheel of the tire-wheel assembly, in the plane.

4. The fixing element according to claim 1, wherein the number of bearing parts is equal to 3.

5. The fixing element according to claim 1, wherein said attachment piece can undergo plastic deformation so as to enable the geometry of the fixing element to adapt to the geometry of the wheel during the mounting of the element on a tire-wheel assembly.

6. A fixing element that enables an electronic unit to be fixed on the inside of a tire-wheel assembly, on a tubular insert of an inflation valve of the tire-wheel assembly, the fixing element comprising:
   an interface piece comprising means to establish a connection with the tubular insert, and a housing for a seal;
   at least one container holding or designed to hold the electronic unit; and
   at least one attachment piece that enables elastic coupling between the interface piece and the container,
   wherein the attachment piece has a stiffening rod designed to come in contact with the tubular insert of the inflation valve when the fixing element is fixed on the tubular insert.

7. A fixing element that enables an electronic unit to be fixed on the inside of a tire-wheel assembly, on a tubular insert of an inflation valve of the tire-wheel assembly, the fixing element comprising:
   an interface piece comprising means to establish a connection with the tubular insert, and a housing for a seal;
   at least one container holding or designed to hold the electronic unit; and
   at least one attachment piece that enables elastic coupling between the interface piece and the container,
   further comprising a rigid stop which restricts the elastic deformation of the attachment piece.

8. The fixing element according to claim 7, wherein said stop comprises a protuberance on the container which is designed to come in contact with the interface piece or, when the fixing element is fixed on the tubular insert, with the tubular insert, if the elastic deformation of the attachment piece exceeds a certain predetermined amount.

9. A fixing element that enables an electronic unit to be fixed on the inside of a tire-wheel assembly, on a tubular insert of an inflation valve of the tire-wheel assembly, the fixing element comprising:
   an interface piece comprising means to establish a connection with the tubular insert, and a housing for a seal;
   at least one container holding or designed to hold the electronic unit; and
   at least one attachment piece that enables elastic coupling between the interface piece and the container,
   wherein said attachment piece is U-shaped or V-shaped in an axial section plane, the "U" or "V" being open on the radially outer side.

10. A fixing element that enables an electronic unit to be fixed on the inside of a tire-wheel assembly, on a tubular insert of an inflation valve of the tire-wheel assembly, the fixing element comprising:
   an interface piece comprising means to establish a connection with the tubular insert, and a housing for a seal;
   at least one container holding or designed to hold the electronic unit; and
   at least one attachment piece that enables elastic coupling between the interface piece and the container,
   wherein said interface piece has a tapped thread enabling the piece to be screwed onto the tubular insert of the valve.

11. A method for mounting an electronic unit on a tire-wheel assembly, the method comprising the steps of:
   A) placing a seal in the housing of a fixing element according to claim 10 and containing the electronic unit;
   B) placing the fixing element and the seal on the rim of the tire-wheel assembly, in such manner that the seal surrounds a rim hole of the said rim;
   C) introducing a tubular insert provided with a clamping nut into a rim hole of the tire-wheel assembly in such manner that, when the tire is mounted on the wheel, the nut is on the outside of the volume delimited by the tire and the wheel, and one end of the tubular insert is inside that volume;
   D) screwing the tubular insert provided with the clamping nut into the tapped thread of the interface piece of the fixing element, in such manner that the clamping screw comes in contact with the rim and exerts a tension force on the fixing element to compress the seal against the rim, so that the tire-wheel assembly is leakproof; and
   E) mounting the tire on the wheel.

12. An assembly comprising:
   an inflation valve comprising a tubular insert and a clamping nut, the clamping nut being located on a portion of the tubular insert which, when the valve is mounted on a tire-wheel assembly, is located on the outside of the tire-wheel assembly;
   a fixing element fixed on the valve, the fixing element enabling an electronic unit to be fixed on the inside of the tire-wheel assembly, on the tubular insert, the fixing element having:
      (i) an interface piece comprising means to establish a connection with the tubular insert, and a housing for a seal;
      (ii) tip at least one container holding or designed to hold the electronic unit; and
      (iii) at least one attachment piece that enables elastic coupling between the interface piece and the container; and
   a seal fitted into a housing of the interface piece of the fixing element;
   wherein the assembly is configured such that when it is mounted on a tire-wheel assembly and the clamping nut is tightened, the tubular insert exerts a tension force on the fixing element such as to compress the seal against the wheel so that the tire-wheel assembly is leakproof.

13. A tire-wheel assembly comprising an assembly according to claim 12.

14. A method for mounting an electronic unit on a tire-wheel assembly, the method comprising the steps of:
   A) providing a fixing element that enables the electronic unit to be fixed on the inside of the tire-wheel assembly, on a tubular insert of an inflation valve of the tire-wheel assembly, the fixing element having:
      (i) an interface piece comprising means to establish a connection with the tubular insert, and a housing for a seal;
      (ii) at least one container holding or designed to hold the electronic unit; and
      (iii) at least one attachment piece that enables elastic coupling between the interface piece and the container, the fixing element containing the electronic unit, and fixing the fixing element on a tubular insert of an inflation valve and fitting a suitable seal into the housing provided in the interface piece of the fixing element;
   B) introducing the tubular insert into a rim hole of the wheel of the tire-wheel assembly in such manner that when the tire is mounted on the wheel, the fixing element is inside the volume delimited by the tire and the wheel, and one end of the tubular insert is outside that volume;
   C) screwing a clamping nut onto the end of the tubular insert in such manner that the clamping nut is in contact with the wheel and exerts a tension force on the tubular insert, and consequently on the fixing element, the result of this force being to compress the seal against the wheel, thereby ensuring that the tire-wheel assembly is leakproof; and
   D) mounting the tire on the wheel.

15. A method for mounting an electronic unit on a tire-wheel assembly, the method comprising the steps of:
   A) providing a fixing element that enables the electronic unit to be fixed on the inside of the tire-wheel assembly, on a tubular insert of an inflation valve of the tire-wheel assembly, the fixing element having:
      (i) an interface piece comprising means to establish a connection with the tubular insert, and a housing for a seal;
      (ii) at least one container holding or designed to hold the electronic unit; and
      (iii) at least one attachment piece that enables elastic coupling between the interface piece and the container and fixing the fixing element on a tubular insert of an inflation valve and fitting a suitable seal into the housing provided in the interface piece of the fixing element;
   B) introducing the tubular insert into a rim hole of the wheel of the tire-wheel assembly in such manner that when the tire is mounted on the wheel, the fixing element is inside the volume delimited by the tire and the wheel, and one end of the tubular insert is outside that volume;
   C) screwing a clamping nut onto the end of the tubular insert in such manner that the clamping nut is in contact with the wheel and exerts a tension force on the tubular insert, and consequently on the fixing element, to compress the seal against the wheel so that the tire-wheel assembly is leakproof;

D) inserting the electronic unit into the container of the fixing element; and

E) mounting the tire on the wheel.

\* \* \* \* \*